Patented Sept. 23, 1941

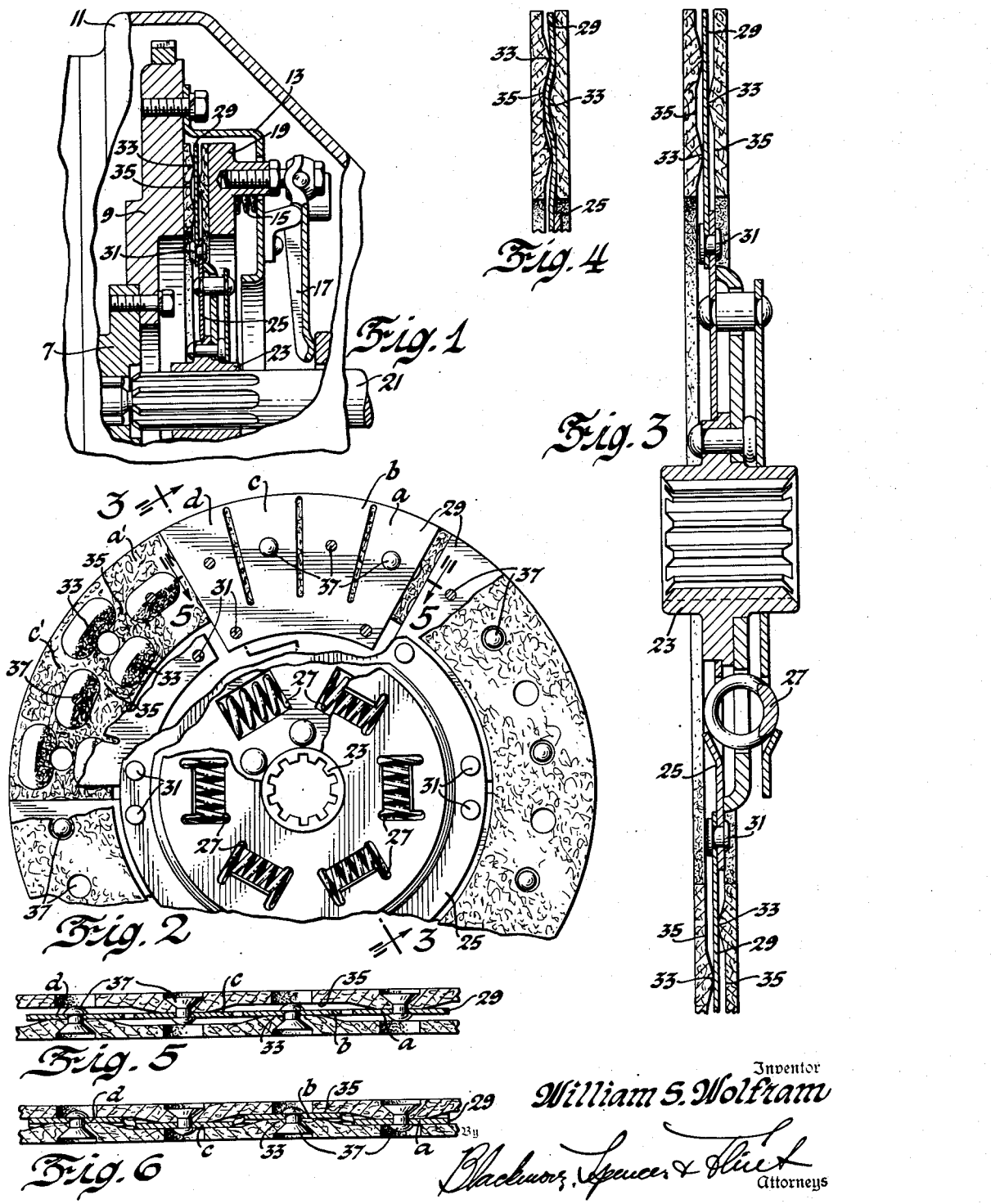

2,256,698

UNITED STATES PATENT OFFICE 2,256,698

CLUTCH DRIVEN PLATE

William S. Wolfram, Dayton, Ohio, assignor to General Motors Corporation, Detroit, Mich., a corporation of Delaware Application April 15, 1940, Serial No. 329,676

3 Claims. (Cl. 192—107)

This invention relates to releasable clutches such as are used on motor vehicles between the engine and the change speed transmission.

An object of the invention is to improve the driven member of such a clutch.

A further object is to improve that part of the driven clutch disk which is to be gripped between the engine flywheel and the conventional pressure plate, which plate is mounted to rotate jointly with the flywheel and to reciprocate toward the flywheel in the act of clutch engagement.

Other objects and advantages will appear from the description which follows.

On the drawing:

Figure 1 shows a transverse section through a clutch embodying my invention.

Figure 2 is a view in elevation, partly broken away, of the driven disk.

Figure 3 is a section on line 3—3 of Figure 2.

Figure 4 is a sectional detail corresponding to Figure 3 but showing the parts displaced.

Figure 5 is a section on line 5—5 of Figure 2, the clutch being disengaged.

Figure 6 is a view like Figure 5 but showing the clutch engaged.

Referring to the several figures the engine shaft 7 is shown carrying a flywheel 9 enclosed by a housing 11. A cover and spring abutment is marked 13. One of the clutch engaging springs is seen at 15. Numeral 17 is one of the levers used to release the clutch in the usual way. Clockwise rotation of the lever as shown in Figure 1 moves the pressure plate away from the flywheel.

The driven shaft is marked 21. It carries non-rotatably a driven disk comprising a hub 23 and an intermediate portion designated as a whole by numeral 25. Torque cushioning may be provided between the hub 23 and part 25 by springs 27. The third and outer part of the driven disk assembly includes a plurality of segmental spring plates 29 distributed in a circular series and secured by rivets 31 to the outer marginal part of plate 25. These segments 29 are normally flat or substantially so. Each has a plurality of radial slots distributed uniformly to form a plurality of sectors marked $a$, $b$, $c$ and $d$. Annular friction faces are secured to the opposed surfaces of the segments. Each facing has ridges 33 and valleys 35. Briefly described, that part $a'$ of one facing in the region opposite one end sector ($a$) of each segment has a ridge at a radially intermediate region in contact with and secured to that sector. Outwardly and inwardly from said ridge are valleys. That part $c'$ of this same facing opposite sector $c$ is similarly provided with a ridge and valleys. At the second and fourth sectors $b$ and $d$, a radially intermediate valley is present between inner and outer unattached ridges. The other facing is similarly provided with alternating single and double ridges, the single ridge part of one facing being opposite the double ridge part of the other. Attaching rivets 37 are secured along a circumferential line and secure the intermediate ridges to the segments. By this construction and by reference to Figures 3 and 5, it will be seen that the segments are normally flat but are distorted to the form shown by Figures 4 and 6 when the pressure plate is advanced to clutch engaging position. The distortion from the flat condition offers a resistance to the engagement of the clutch and prevents grabbing.

I claim:

1. In a clutch, a driven plate having a radially divided resilient outer ring, facings on opposite sides of said ring, said facings having ridges and valleys on their adjacent faces whereby the ring may be distorted by pressure applied to the remote faces of the facings, there being valleys arranged both radially and circumferentially relative to each ridge.

2. The invention defined by claim 1, each ridge of one facing being opposite a valley of the other facing.

3. In a clutch, a driven plate having a radially divided resilient ring forming a plurality of segments, each segment having radial slots to form a plurality of sectors, friction facings, one on each side of said ring, the facings having ridges on their adjacent faces, the ridges corresponding to adjacent sectors being radially staggered, whereby spaced valleys are formed and distributed both radially and circumferentially, the valleys of one facing being opposite the ridges of the other.

WILLIAM S. WOLFRAM.